US006265011B1

(12) United States Patent
Kelly et al.

(10) Patent No.: US 6,265,011 B1
(45) Date of Patent: Jul. 24, 2001

(54) DOG BISCUIT FOR CONTROLLING MALODOROUS BREATH IN DOGS

(76) Inventors: Wayne Kelly; Jennifer Kelly, both of 1030 S. Barton St., #276, Arlington, VA (US) 22204

(*) Notice: Subject to any disclaimer, the term of this patent is extended or adjusted under 35 U.S.C. 154(b) by 0 days.

(21) Appl. No.: 09/560,284

(22) Filed: Apr. 27, 2000

(51) Int. Cl.[7] .................... A21D 2/18; A21D 2/36
(52) U.S. Cl. ............... 426/549; 426/623; 426/635; 426/648; 426/656; 426/661; 426/805
(58) Field of Search .................... 426/549, 623, 426/635, 648, 656, 661, 805

(56) References Cited

U.S. PATENT DOCUMENTS

| | | | |
|---|---|---|---|
| 4,132,770 | * 1/1979 | Barth | 424/49 |
| 4,294,857 | 10/1981 | Fuller | 426/99 |
| 4,303,648 | * 12/1981 | Witzel et al. | 424/158 |
| 4,774,098 | 9/1988 | Gould et al. | 426/549 |
| 4,800,099 | 1/1989 | Gellman et al. | 426/641 |
| 4,997,671 | 3/1991 | Spanier | 426/646 |
| 5,000,973 | 3/1991 | Scaglione et al. | 426/549 |
| 5,015,485 | 5/1991 | Scaglione et al. | 426/94 |
| 5,094,870 | 3/1992 | Scaglione et al. | 426/549 |
| 5,095,008 | 3/1992 | Pflaumer et al. | 514/23 |
| 5,405,604 | * 4/1995 | Hall | 424/54 |
| 5,405,836 | 4/1995 | Richar et al. | 514/23 |
| 5,534,243 | * 7/1996 | Dixon, Jr. et al. | 424/49 |
| 5,552,176 | 9/1996 | Marino | 426/641 |
| 5,681,549 | * 10/1997 | McLaughlin et al. | 424/54 |
| 5,900,251 | * 5/1999 | Raissen | 424/456 |
| 5,955,123 | 9/1999 | Daggy | 426/21 |
| 5,976,549 | 11/1999 | Lewandowski | 424/195.1 |
| 5,989,604 | 11/1999 | Wolf et al. | 426/103 |
| 6,030,605 | * 2/2000 | D'Ameila et al. | 424/48 |

FOREIGN PATENT DOCUMENTS

9939686 * 6/1998 (WO).

OTHER PUBLICATIONS

Product Alert, vol. 29 (No. 24), (Natural Life Pet Products), Dec. 27, 1999.*

"Home Remedies for Dogs & Cats", Editors: Prevention Magazine Healthbook, Rodale Press, 1996.*

* cited by examiner

Primary Examiner—Chhaya D. Sayala
(74) Attorney, Agent, or Firm—Richard C. Litman

(57) ABSTRACT

A dog biscuit is disclosed for controlling malodorous breath in dogs. The dog biscuit includes about 8–12 parts by weight whole wheat flour, about 4–6 parts oat bran, about 2–3 parts non-fat dry milk, and about 2–3 parts brown rice flour. The dog biscuit also includes water, vanilla extract, parsley, alfalfa powder, vegetable oil, peppermint extract, tarragon, peppermint leaf powder, and spearmint leaf powder. The vegetable oil includes an antioxidant and is preferably sunflower oil. The parsley is preferably fresh parsley, and the ratio of parsley to whole wheat flour is about 1:4 by weight. The dog biscuit is readily eaten by dogs and effectively neutralizes malodorous breath in them. Also part of the invention is a method of making the dog biscuit.

5 Claims, No Drawings

DOG BISCUIT FOR CONTROLLING MALODOROUS BREATH IN DOGS

BACKGROUND OF THE INVENTION

1. Field of the Invention

The present invention relates generally to dog biscuits, and specifically to dog biscuits for neutralizing malodorous breath.

2. Description of the Related Art

Bad breath in dogs is a well-known problem. For dogs which are particularly susceptible, the problem can cause significant annoyance to the dog's owners. Even mild cases may interfere with the relationship between the dog and some or all of the household members. While compositions for freshening the breath of dogs are known, many dogs find the taste of these compositions unpleasant. Known compositions occasionally include ingredients which may be harmful to the dog.

U.S. Pat. No. 4,294,857 to Fuller discloses dog food compositions of low or intermediate moisture content in which palatability to dogs is improved by adding linalool. Linalool is stated to be found in the volatile oils of various flowers, fruits, grasses, leaves, roots, seeds, and woods.

U.S. Pat. No. 4,774,098 to Gould et al. teaches a modified plant fiber additive for food formulations. The additive is an alkaline peroxide-treated conversion product of a non-woody lignocellulosic substrate, such as wheat straw or oat straw. The high-fiber additive is suitable for consumption by humans or monogastric animals.

U.S. Pat. No. 4,800,099 to Gellman et al. discloses a dry, hard canine biscuit having visually apparent discrete particles containing meat, farinaceous material, and/or textured vegetable protein. The farinaceous material may include wheat, corn, oats, rye, barley, milo, and rice. A preferred dough for the preparation of the canine biscuits contains 50–60% by weight wheat flour, 5–10% soybean meal, 3–10% meat and bone meal, 1–5% wheat meal, 1–5% animal fat with BHA, 20–30% water, and 2–5% of natural flavors, vitamins, minerals, and acidulant. The resulting biscuits are hard enough to stimulate the jaw bones and clean the teeth of canines.

U.S. Pat. No. 4,997,671 to Spanier teaches a chewy, semi-plastic, non-porous, microbiologically-stable dog snack or biscuit. The dog food includes 12–30% by weight of gelatin; an acidulant such as citric acid; a cereal starch-containing textural agent; a release agent; a taste agent; sugar; salt; and water. Flavorants such as cheese powder; colorants; and preservatives may be added. Wheat meal, corn starch, wheat starch, and rice starch may be used as the cereal starch-containing textural agent. The release agent may be lecithin or tallow. The taste agent may be beef or other meat meal or powder, bone meal, or hydrogenated vegetable oil. The dog snacks can also include other ingredients such as dried skimmed milk, oat meal, soy bran, wheat bran, and alfalfa meal.

U.S. Pat. Nos. 5,000,973, 5,015,485, and 5,094,870 to Scaglione et al. disclose a process for preparing nutritionally-balanced dog biscuits which contain an inorganic pyrophosphate salt. Preferably the pyrophosphate salt is a combination of sodium acid pyrophosphate and tetrapotassium pyrophosphate. The pyrophosphate may be applied as a coating on the dog biscuit dough pieces. A suitable dog biscuit dough contains wheat flour, wheat meal, soybean meal, meat and bone meal, animal fat, natural flavors, and water. The flavorants may include milk, cheese, or meat. The dog biscuits reduce or prevent tartar accumulations on the teeth.

U.S. Pat. No. 5,095,008 to Pflaumer et al. teaches cookies containing psyllium and a method for making the cookies. The cookies may also contain polyol polyesters. The cookies are high in fiber and help to treat gastrointestinal disorders and reduce cholesterol in humans.

U.S. Pat. No. 5,405,836 to Richar et al. discloses pet biscuits which freshen the breath of dogs and other animals. The biscuits are prepared by topically applying a breath freshening amount of a water-soluble zinc salt to a farinaceous-based dry pet food. The zinc salt is preferably applied after baking. A suitable dough is stated to include 50–60% by weight wheat flour, 5–10% soybean meal, 3–10% of meat and bone meal, 1–5% of wheat meal, 1–5% of animal fat preserved with BHA, 20–30% water, and 2–5% natural flavors, vitamins and minerals, and acidulant. Effectiveness in reducing malodorous breath was determined by measuring reduction of volatile sulfur compounds in the oral headspace of dogs, by gas chromatograph. Effectiveness was also measured by subjective evaluation of the breath of dogs. As a control, dog biscuits containing 8 mgs chlorophyll in each biscuit were also tested and found to be no more effective than dog biscuits containing no breath-freshening ingredients.

U.S. Pat. No. 5,976,549 to Lewandowski teaches a method for reducing bad breath in cats and dogs by coating or adulterating the animal's food or snacks with raw garlic powder.

U.S. Pat. No. 5,552,176 to Marino discloses a pet food premix preparation which includes 40–70% non-rendered meat, and the balance of farinaceous and/or plant proteinaceous carrier substrate. The dried premix is used in the preparation of pet food, including food treats. The premix may include whole ground wheat, wheat flour, rice flour, and oat bran.

U.S. Pat. No. 5,955,123 to Daggy teaches cookies, bread, pancakes, and other baked compositions including psyllium. These are stated to be useful for regulating bowel function and/or increasing fiber consumption in humans or lower animals. The compositions may be flavored with vanilla, peppermint, and spearmint.

U.S. Pat. No. 5,989,604 to Wolf et al. teaches a pet foodstuff containing xylitol for reducing dental caries in non-human animals. The foodstuff is also useful for reducing malodorous breath in animals. The foodstuff may be a dog biscuit or treat. A preferred biscuit includes whole wheat flour, brewer's yeast, wheat germ, bone meal, chicken broth, canola oil, and whole egg. Zinc compound, parsley, and baking soda may be included for dental malodor control. Sunflower oil may be used. Parsley is stated to be included as a chlorophyll source. Other ingredients such as various botanicals or enzymes may be added, as well as flavorings.

None of the above inventions and patents, taken either singularly or in combination, is seen to describe the instant invention as claimed. Thus a dog biscuit for controlling malodorous breath in dogs solving the aforementioned problems is desired.

SUMMARY OF THE INVENTION

The present invention is a dog biscuit for controlling malodorous breath in dogs. The dog biscuit includes about 8–12 parts by weight whole wheat flour, about 4–6 parts oat bran, about 2–3 parts non-fat dry milk, and about 2–3 parts brown rice flour. The dog biscuit also includes water, vanilla extract, parsley, alfalfa powder, vegetable oil, peppermint extract, tarragon, peppermint leaf powder, and spearmint leaf powder. The vegetable oil includes an antioxidant and is preferably sunflower oil. The parsley is preferably fresh parsley, and the ratio of parsley to whole wheat flour is about 1:4 by weight. The dog biscuit is readily eaten by dogs and effectively neutralizes malodorous breath in them. Also part of the invention is a method of making the dog biscuit.

Accordingly, it is a principal object of the invention to provide a dog biscuit which effectively neutralizes malodorous breath in dogs.

It is another object of the invention to provide a dog biscuit which has a pleasant taste and is readily eaten by dogs.

It is a further object of the invention to provide a dog biscuit which is easily manufactured and has good keeping qualities.

It is an object of the invention to provide an improved composition for the purposes described which is inexpensive, dependable and fully effective in accomplishing its intended purposes.

These and other objects of the present invention will become readily apparent upon further review of the following specification.

DETAILED DESCRIPTION OF THE PREFERRED EMBODIMENTS

The present invention is a dog biscuit for controlling malodorous breath in dogs. The dog biscuit includes 8–12 parts by weight whole wheat flour, 4–6 parts oat bran, 2–3 parts non-fat dry milk, and 2–3 parts brown rice flour. The dog biscuit also includes water, vanilla extract, parsley, alfalfa powder, vegetable oil, peppermint extract, tarragon, peppermint leaf powder, and spearmint leaf powder.

The farinaceous ingredients are preferably whole wheat flour, oat bran, and brown rice flour. Small amounts of other flours and farinaceous ingredients such as ordinary wheat flour, wheat bran, rice flour, soybean meal, and corn meal, may be included in the biscuits. However, the flavor, texture and effectiveness of the dog biscuits will be degraded if substantial amounts are substituted.

Small amounts of other ingredients may be added if desired, provided these will not affect the taste, texture, or effectiveness of the biscuits. An example is small amounts of vitamins and minerals.

All of the parsley used is preferably fresh parsley. Fresh parsley is inexpensive and readily available from grocery stores and other produce suppliers. The ratio of the fresh parsley to the whole wheat flour may range from 1:3 to 1:5 but is optimally about 1:4 by weight. Fresh parsley contributes to the taste and the texture of the dog biscuits. Fresh parsley also aids in neutralizing malodorous breath. Among its other qualities, fresh parsley is a source of chlorophyll, which in combination with the other ingredients helps to control malodorous breath.

The tarragon is preferably entirely in dried form. The tarragon, the alfalfa leaf powder, the peppermint leaf powder, and the spearmint leaf powder are available from herb and spice retailers, such as The Monterey Spice Co. The ratio of the tarragon to the alfalfa powder preferably ranges from 0.75:3 to 1.25:3, most preferably about 1:3 by volume. The ratio of the tarragon to the peppermint leaf powder and the spearmint leaf powder is ideally about 3:1:1 by volume.

The tarragon, the alfalfa leaf powder, the peppermint leaf powder, and the spearmint leaf powder all contribute both to the flavor and to the effectiveness in neutralizing malodorous breath. Use of too large an amount of any of these ingredients tends to reduce acceptability of the dog biscuit by the dog. Use of too small an amount tends to reduce the effectiveness, as well as degrading the taste.

The vanilla extract and the peppermint extract are conventional extracts used in baking and flavoring. These extracts are readily available from grocery retailers and wholesalers. The ratio of the vanilla extract to the peppermint extract may range from 3:1.5 to 3:3 but is preferably about 3:2 by volume. The vanilla extract enhances the flavor of the biscuits so that dogs will consume them. The peppermint extract contributes to the flavor and to neutralizing malodorous breath.

The vegetable oil includes a small amount of an antioxidant to maintain freshness. The vegetable oil is preferably sunflower oil. The antioxidant is preferably vitamin E in the form of mixed tocopherols. The ratio of the sunflower oil to the whole wheat flour is preferably about 1:10 to 1:18 by weight, most preferably 1:14 by weight. The ratio of the sunflower oil to the alfalfa powder and the tarragon is preferably about 2:3:1 by volume. The use of sunflower oil contributes to the texture of the dog biscuits as well as to the taste and to the effectiveness in controlling malodorous breath.

The dog biscuit preferably consists of or consists essentially of the whole wheat flour, the oat bran, the non-fat dry milk, the brown rice flour, the water, the vanilla extract, the fresh parsley, the alfalfa powder, the sunflower oil, the peppermint extract, the tarragon, the peppermint leaf powder, and the spearmint leaf powder.

The dog biscuits are produced by combining the various ingredients to make a dough. The dough preferably includes 8 to 12 parts by weight whole wheat flour; 4 to 6 parts by weight oat bran; 4 to 6 parts by weight water; 2 to 3 parts by weight non-fat dry milk; 2 to 3 parts by weight brown rice flour; and 2 to 3 parts by weight fresh parsley. Preferably the dough contains about 10 parts by weight of the whole wheat flour; about 5 parts by weight of the oat bran and the water; and about 2.5 parts by weight of the non-fat dry milk, the brown rice flour, and the fresh parsley. The whole wheat flour is preferably about 35% by weight of the total dough. The oat bran and the water are each preferably about 17% by weight. The dry milk, the brown rice flour, and the fresh parsley are each preferably about 8% by weight of the total dough.

The remaining ingredients are also added to the dough. As described above, these include breath-freshening effective amounts of the other active ingredients: alfalfa powder; vegetable oil (preferably sunflower with vitamin E as antioxidant); peppermint extract; tarragon; peppermint leaf powder; and spearmint leaf powder. A sufficient amount of the vanilla extract is added to produce an acceptable taste for dogs. The sunflower oil is preferably about 2% by weight of the total dough.

Further steps of the method are forming the dough into a plurality of dog biscuits and baking the dog biscuits. The forming may be done by rolling the dough to a thickness of approximately 1 cm and cutting the dough in the desired shapes. The dough may also be extruded. The resulting dog biscuits are hard or semi-hard, and have a desirable texture for chewing.

The dog biscuits are fed to a dog having malodorous breath, so that the malodorous breath is neutralized. For maximum effectiveness, the dog biscuits are provided to the dog after a meal.

The present invention also includes the product produced by the above method of making the dog biscuits. The dog biscuits prepared using the listed ingredients in the disclosed ratios have a desirable texture for chewing by dogs, neither too soft nor too hard. The dog biscuits have a taste which dogs like. Dogs will readily consume the dog biscuits. The dog biscuits also have good keeping qualities. Use of ingredient proportions outside those listed tends to produce a dog biscuit which dogs refuse to eat; which spoils or goes stale quickly; or which is ineffective in freshening breath.

The mechanism of action of the biscuits in controlling malodorous breath in dogs is not completely known. The high chlorophyll content of the alfalfa and parsley contribute to the effect, but the effect of the alfalfa and the parsley is greater than would be expected from their chlorophyll content alone. The remainder of the ingredients in the proportions described also contribute to the overall effectiveness. The dog biscuits are significantly more effective and easier to administer than known breath fresheners for dogs. The ingredients are natural and will not harm the dog.

EXAMPLE

Dog biscuit dough was prepared using the following ingredients:

32 oz. (906 g) whole wheat flour
16 oz. (453 g) oat bran
16 oz. (453 g) water
8 oz. (226 g) non-fat dry milk
8 oz. (226 g) brown rice flour
8 oz. (226 g) fresh parsley
6 Tbsp. (96 ml) alfalfa powder
4 Tbsp. (64 ml) sunflower oil (including 1.25 g vitamin E in the form of mixed tocopherols)
3 Tbsp. (48 ml) vanilla extract
2 Tbsp. (32 ml) peppermint extract
2 Tbsp. (32 ml) dried tarragon
2 tsp. (10 ml) peppermint leaf powder
2 tsp. (10 ml) spearmint leaf powder.

The ingredients were mixed together to form the dough. The dough was rolled out to a thickness of approximately ⅜ inches (1 cm). The biscuits were cut out in the desired shape and baked at 350° F. (180° C.) for approximately 40 minutes. The dog biscuits were tested on 140 dogs over the course of 3 months. Surveys of the dog owners found that the dogs had either a great reduction or complete neutralization of malodorous breath. The effect lasted at least several hours and up to an entire day after consumption. This long-term effect indicates that malodorous breath was neutralized by the immediate consumption and chewing of the dog biscuits, and also by their digestion.

It is to be understood that the present invention is not limited to the embodiments described above, but encompasses any and all embodiments within the scope of the following claims.

We claim:

1. A dog biscuit for controlling malodorous breath in dogs, the dog biscuit comprising:

8 to 12 parts by weight whole wheat flour;

4 to 6 parts by weight oat bran;

2 to 3 parts by weight non-fat dry milk;

2 to 3 parts by weight brown rice flour;

water;

vanilla extract;

fresh parsley, wherein the ratio of the fresh parsley to the whole wheat flour is about 1:4 by weight;

alfalfa powder;

vegetable oil, the vegetable oil including an antioxidant, wherein the ratio of the vegetable oil to the whole wheat flour is about 1:14 by weight;

peppermint extract, wherein the ratio of the peppermint extract to the vanilla extract is about 2:3 by volume;

dried tarragon;

peppermint leaf powder; and spearmint leaf powder;

wherein the ratio of the dried tarragon to the peppermint leaf powder and the spearmint leaf powder is about 3:1:1 by volume, and the ratio of the dried tarragon to the alfalfa powder is about 1:3 by volume.

2. The dog biscuit according to claim 1, wherein the dog biscuit includes:

about 10 parts by weight of the whole wheat flour;

about 5 parts by weight of the oat bran;

about 2.5 parts by weight of the non-fat dry milk;

about 2.5 parts by weight of the brown rice flour.

3. The dog biscuit according to claim 1, wherein the vegetable oil is sunflower oil.

4. The dog biscuit according to claim 1, wherein the antioxidant is vitamin E, and the vitamin E is in the form of mixed tocopherols.

5. The dog biscuit according to claim 1, wherein the vegetable oil is sunflower oil, the antioxidant is vitamin E, and the dog biscuit consists essentially of the whole wheat flour, the oat bran, the non-fat dry milk, the brown rice flour, the water, the vanilla extract, the parsley, the alfalfa powder, the sunflower oil, the peppermint extract, the tarragon, the peppermint leaf powder, and the spearmint leaf powder.

* * * * *